W. WILMINGTON.
Thrashing Machine.
No. 5,595.
Patented May 23, 1848.
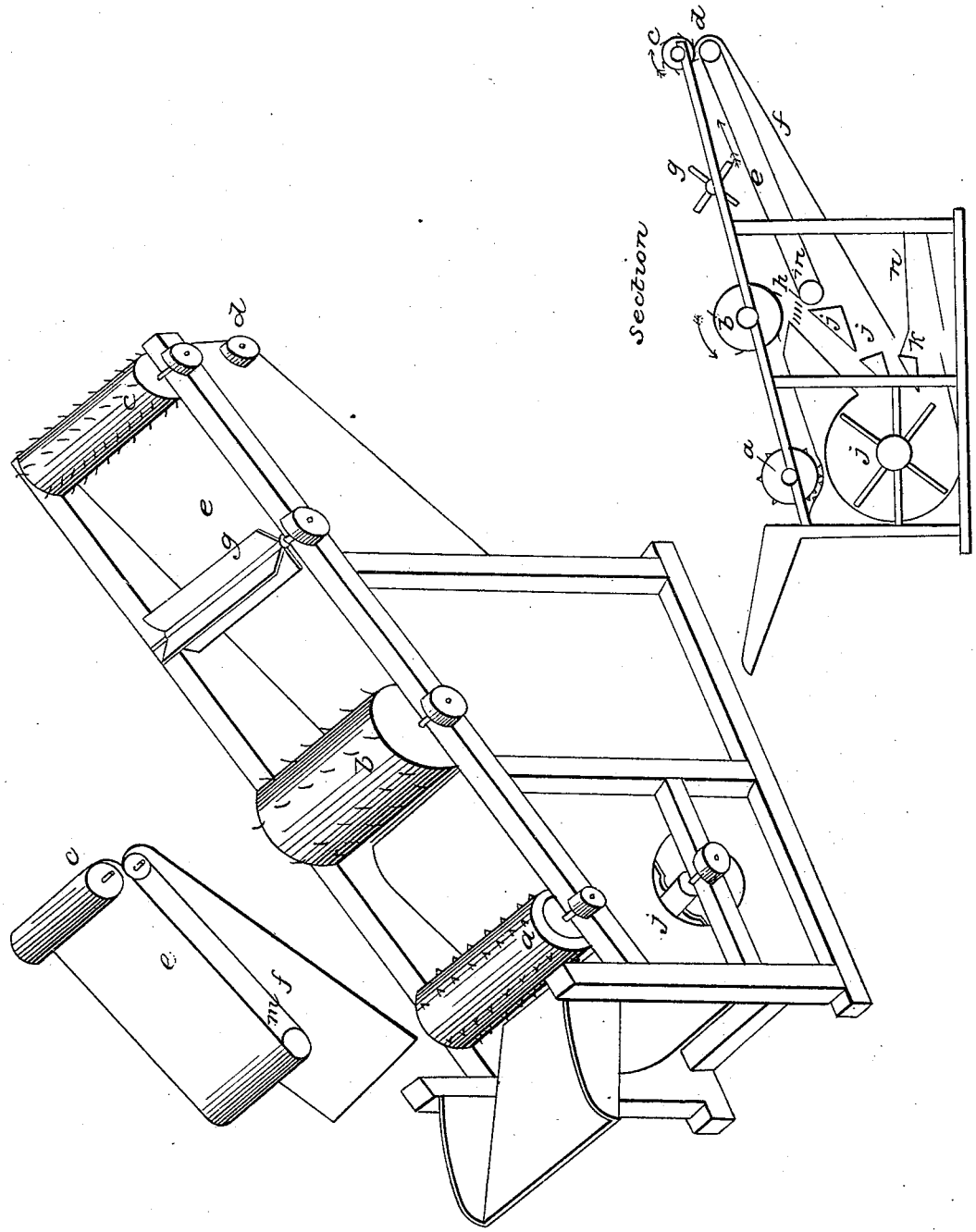

UNITED STATES PATENT OFFICE.

WM. WILMINGTON, OF SOUTH BEND, INDIANA.

GRAIN-SEPARATOR.

Specification of Letters Patent No. 5,595, dated May 23, 1848.

*To all whom it may concern:*

Be it known that I, WILLIAM WILMINGTON, of South Bend, county of St. Joseph, State of Indiana, have invented a new and Improved Mode of Separating Grain from Straw and Chaff; and I do hereby declare the following is a full and exact description.

The nature of my invention consists in so applying a current of air, in unison with a cylinder rake and a revolving apron as to completely effect the separation required.

The grain and straw having passed the thrashing cylinder marked $a$, in the drawings annexed, is thrown to, and caught by the cylinder rake $b$. In passing under this cylinder, most of the grain falls through the grates marked $h$, and is conducted down to the riddle $n$ (or hopper) the straw and remaining grain passes on to the revolving apron $e$ in passing up which it receives the action of the revolving beater $g$. Having passed to the upper end of the apron $s$ it meets a current of air, issuing from between the upper end of the revolving apron $e$ and the cylinder $c$, the chaff and straw being raised by the current of air are taken up by the cylinder rake $c$, and carried over it. The grain which has been brought on to the revolving apron $e$ is carried over its upper end where it follows the wind curve of the slide $f$ and is conducted down to the riddle $n$.

Having thus described the operation of my machine what I claim as my invention, is—

Having thus described the operation of between the guides $j$ and $k$ on to the slide $f$, conducting it along the under side of the apron $e$, to the curve in the upper end of the slide $f$ following the curve around the pulley $d$, and discharging it directly between the cylinder $c$, and the pulley $d$, upon the upper side of the apron $e$.

WM. WILMINGTON.

Witnesses:
CHAS. M. HEATON,
EZRA G. CARPENTER.